(12) United States Patent
Levaray et al.

(10) Patent No.: US 9,789,770 B2
(45) Date of Patent: Oct. 17, 2017

(54) WORK MACHINE, IN PARTICULAR DUMP TRUCK OR TRUCK

(71) Applicant: Liebherr-Mining Equipment Colmar SAS, Colmar (FR)

(72) Inventors: Adrien Levaray, Colmar (FR); Bernd Sommer, Biberach (DE); Scott Bellamy, Cleveland (AU)

(73) Assignee: Liebherr-Mining Equipment Colmar SAS, Colmar (FR)

( * ) Notice: Subject to any disclaimer, the term of this patent is extended or adjusted under 35 U.S.C. 154(b) by 0 days.

(21) Appl. No.: 14/797,713

(22) Filed: Jul. 13, 2015

(65) Prior Publication Data

US 2016/0009183 A1    Jan. 14, 2016

(30) Foreign Application Priority Data

Jul. 14, 2014 (DE) .................. 10 2014 010 444
May 13, 2015 (DE) .................. 10 2015 006 225

(51) Int. Cl.
*H02P 9/00* (2006.01)
*B60L 11/02* (2006.01)
*H02P 9/10* (2006.01)

(52) U.S. Cl.
CPC ............... *B60L 11/02* (2013.01); *H02P 9/00* (2013.01); *H02P 9/10* (2013.01); *Y02T 10/7077* (2013.01)

(58) Field of Classification Search
CPC ............... B60L 11/02; B60L 3/00; B60P 1/04
USPC .................. 290/7, 45; 180/65.21, 65.245
See application file for complete search history.

(56) References Cited

U.S. PATENT DOCUMENTS

| | | | | |
|---|---|---|---|---|
| 2,290,738 A | * | 7/1942 | Chadwick, Jr. | B60P 1/483 298/10 |
| 2,588,627 A | | 11/1952 | Hefel | |
| 4,133,017 A | | 1/1979 | Johnson et al. | |
| 4,292,531 A | * | 9/1981 | Williamson | B60K 6/26 290/14 |
| 4,495,449 A | * | 1/1985 | Black | B60L 11/06 318/60 |
| 5,070,959 A | * | 12/1991 | Grabowski | B60L 11/06 180/167 |
| 5,373,219 A | * | 12/1994 | Grabowski | B60K 6/46 180/65.245 |
| 8,847,558 B2 | * | 9/2014 | Schmidt | B60L 7/10 322/23 |
| 2008/0179945 A1 | * | 7/2008 | Linebach | B60L 9/005 303/122.01 |
| 2010/0066400 A1 | * | 3/2010 | Hendrickson | B60L 3/0023 324/762.07 |
| 2010/0307846 A1 | * | 12/2010 | Kvist | B60K 6/48 180/65.22 |

(Continued)

FOREIGN PATENT DOCUMENTS

CA    2 632 463 A1    12/2008

*Primary Examiner* — Julio C. Gonzalez Ramirez
(74) *Attorney, Agent, or Firm* — Dilworth & Barrese, LLP (57) ABSTRACT

The invention relates to a work machine, in particular in the form of a dump truck or truck, having a diesel electric traction drive, wherein at least one alternator is or can be driven by at least one internal combustion engine of the work machine. In accordance with the invention, the current generation can also be reliably interruptible with a running internal combustion engine by interruption of the excitation circuit by means of a breaker switch.

13 Claims, 6 Drawing Sheets

(56) References Cited

U.S. PATENT DOCUMENTS

| | | | |
|---|---|---|---|
| 2013/0168176 A1* | 7/2013 | Takagi | B60K 6/48 180/291 |
| 2013/0228389 A1* | 9/2013 | Nakashima | B62K 11/10 180/220 |
| 2016/0288746 A1* | 10/2016 | Namuduri | F02N 11/08 |

* cited by examiner

WORK MACHINE, IN PARTICULAR DUMP TRUCK OR TRUCK

BACKGROUND OF THE INVENTION

The invention relates to a work machine, in particular in the form of a dump truck or truck, having a diesel electric drive, wherein a alternator is or can be driven by at least one internal combustion engine of the work machine.

Dump trucks or so-called large dump trucks are predominantly used in coal mining operations or ore mining operations for the transport of the mined coal, minerals and ores. These bulk material dumpers are manufactured in sizes of more than 90 metric tons (t) up to several 100 t in weight and payload so that they have very large dimensions overall.

A diesel electric drive is used as the traction drive, wherein the mechanical energy generated by this diesel engine is converted with the aid of a alternator into electrical energy for the supply of the electric traction drives. The reason for this process is that diesel engines, like all internal combustion engines, can only be operated with ideal efficiency in a very restricted speed range and cannot be started under load. The AC motors for the driving axle which are used can also produce the desired torque in the lower speed range for starting. The internal combustion engine used can be operated continuously in the ideal speed range. Corresponding work machines are described, for example, in DE 10 2014 003 374, DE 10 2014 003 203 and DE 10 2014 003 375.

In such work machines, a large number of components are at high voltage so that corresponding service or maintenance work for the service engineers is associated with great risks. The deployment of especially trained technical personnel is necessary due to this.

A possibility of safely carrying out corresponding service, maintenance and repair work is also switching off the diesel engine. This is, however, frequently not desired since the further systems which are driven by the diesel engine and which are not electrically operated, for example the hydraulic systems and the mechanically driven systems, are to continue to be available during the maintenance work on the electrical system. Solutions are also generally already known from the prior art in which the internal combustion engines continue to run during the maintenance work. A known solution comprises mechanically separating the driving internal combustion engine from the alternator. Another solution comprises short-circuiting and grounding the DC current lines. These solutions are, however, complex and/or expensive since they have to be carried out with a larger mechanical effort and using special electrical tools and trained personnel.

SUMMARY OF THE INVENTION

It is now the object of the present invention also to make possible a simple and safe separation of the current generating circuit during service, maintenance or repair work on work machines of this category by personnel not especially trained for this.

This object is achieved in accordance with the invention by a work machine having the features herein. For this purpose, in a work machine having a diesel electric traction drive in which at least one alternator is or can be driven by at least one internal combustion engine of the work machine, the current generation can also be safely interrupted with a running internal combustion engine by interrupting the excitation circuit of the alternator by means of a breaker switch.

The magnetic field of the alternator is attenuated or reduced by the interruption of the excitation current. The alternator consequently also no longer generates any electrical energy with an unchanged mechanical power at the inlet; the alternator is ideally de-energized at the output side. A regulation, decoupling or even a switching off of the internal combustion engine is not necessary. It is ensured by this solution in accordance with the invention that no high voltages are transmitted despite a running internal combustion engine. The breaker switches for switching off the voltage generation itself are each arranged in low-voltage circuits.

Preferred embodiments of the invention result from the description herein.

In accordance with a first embodiment of the invention, the breaker switch can be arranged in the voltage supply of the excitation circuit. The excitation circuit is typically operated by a 24 volt voltage source. The excitation circuit can be interrupted in a simple manner by interrupting the voltage supply line.

A further preferred embodiment comprises likewise interrupting the excitation circuit in a safe manner by interrupting the line for the control signals.

A combination of the two aforesaid embodiment variants is generally also possible. A breaker switch can thus be arranged both in the voltage supply line of the excitation circuit and additionally in the supply line extending in parallel therewith for the control signals to control the excitation voltage. The switches are ideally coupled with one another such that the manual actuation of a breaker switch triggers an interrupting switching of the second switch.

A further preferred solution of the invention comprises a breaker switch being arranged in the supply line of the excitation circuit to the alternator. A safe switching off of the electrical supply of the work machine is also possible by this interruption despite a running internal combustion engine.

The respective breaker switches can particularly advantageously be secured via a lock. It can hereby be ensured that only the staff interrupts the current generation who have admittedly not been especially trained as a high-voltage electrician, but who have been commission to carry out maintenance work or repair work.

As already presented above with reference to an example, one or more breaker switches can advantageously be arranged at a position of the work machine accessible from the outside.

A breaker switch can, for example, be arranged close to the electrical drive motors. The staff can hereby operate the breaker switch in the direct environment of the electrical components and thus in the region in which the maintenance and service or repair work is to be carried out.

Alternatively or additionally, a breaker switch can also be arranged in a switch cabinet for low-voltage switches which is located in the region of the maintenance and service access in the frontal region of the work machine. Such a breaker switch can otherwise naturally also advantageously be at a different position in the region of the maintenance and service access in the frontal region of the work machine. Alternatively, a breaker switch can, however, also be arranged at the upper deck of the work machine, preferably in the region of the operators cabin or even in the operator's cabin itself.

The provision of the breaker switches makes it possible safely to shut down the current-conductive parts without electrical switch cabinets having to be opened to switch off the components at high voltage. An opening of these switch cabinets is only possibly by especially trained personnel due to the following high voltage and such personnel is also not immediately available in the mining sector or at construction sites.

BRIEF DESCRIPTION OF THE DRAWINGS

Further features, details and advantages of the invention will be explained in more detail with reference to an embodiment shown in the drawing. There are shown.

DESCRIPTION OF THE PREFERRED EMBODIMENTS

Figure 1:
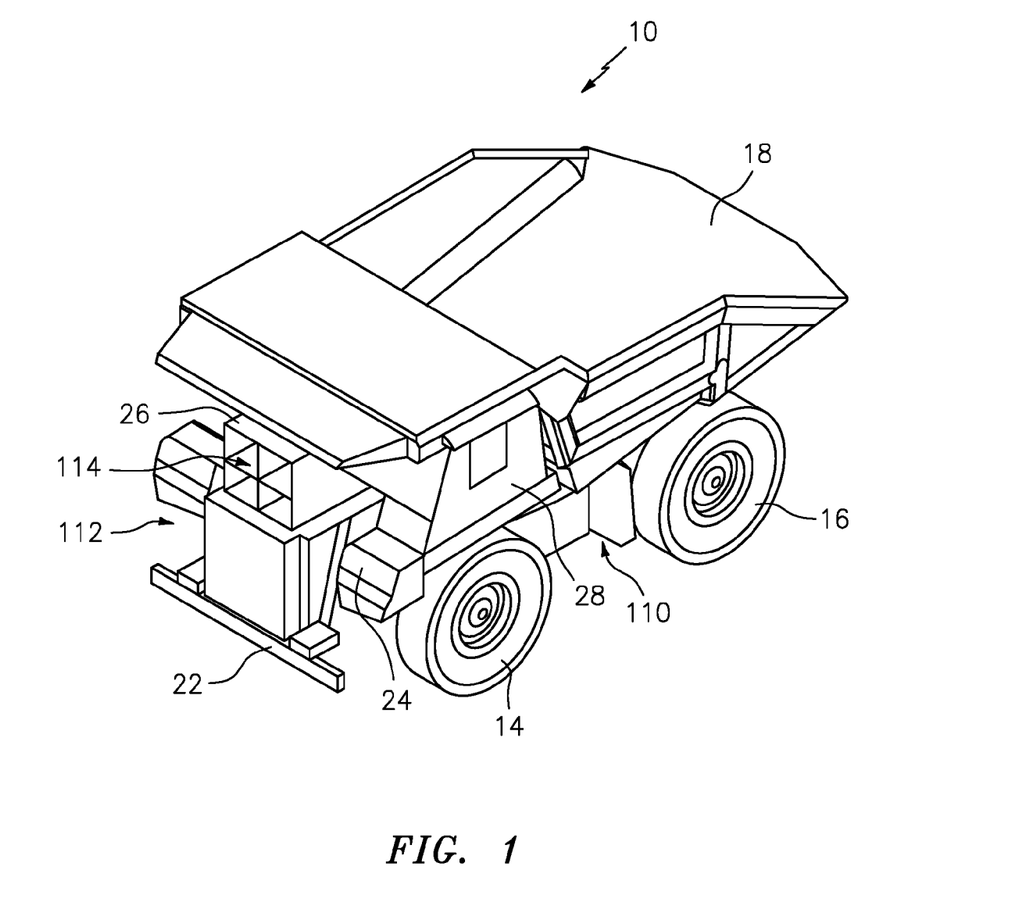
FIG. 1: a perspective representation of a dump truck in accordance with the invention.

A dump truck 10 is shown in FIG. 1. It is here a so-called large dump truck such as is used in ore mines. Front wheels 14 and rear wheels 16, driven via electric motors not shown in any more detail in FIG. 1, are supported at a rigid frame. The rear wheels 16 are designed with dual tires (cf. FIG. 2).

A skip 18 is pivotally connected to the frame and is pivotable via hydraulic lifting cylinders provided at both sides at the vehicle. The vehicle 10 is bounded by the bumper 22 in the region of the vehicle at the front in the direction of travel. A radiator module 24 is arranged above the bumper 22. An upper deck 26 in turn extends over the width of the dump truck 10 above the radiator module 24. An operators cabin 28 is positioned on a side of the upper deck 26, on the side of the upper deck 26 at the left in the direction of travel. The operator's cabin 28 thus lies above the front left wheel 14.

Figure 2:
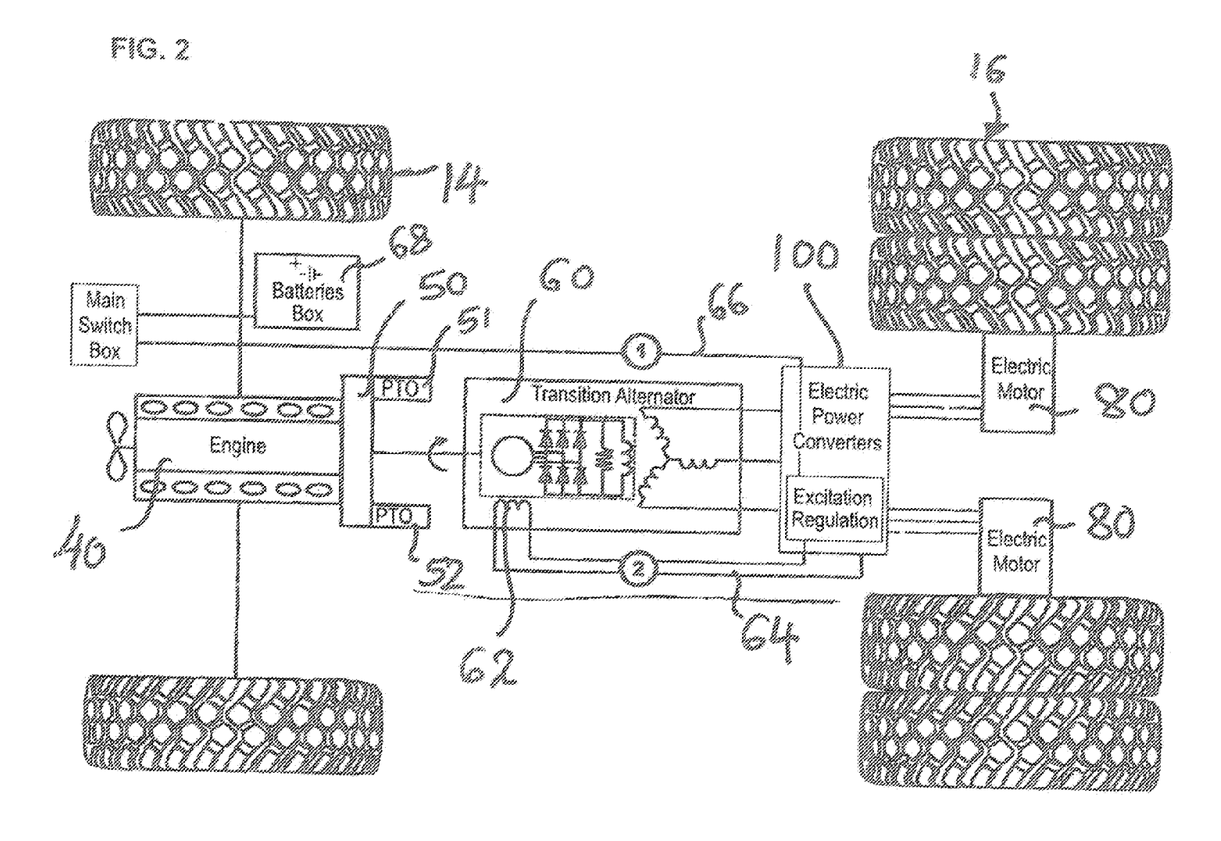
FIG. 2: a schematic representation of the drivetrain in accordance with the invention.

The dump truck 10 comprises a diesel electric drive which is shown in the schematic detailed view in FIG. 2. The drive comprises a diesel engine 40 in the region of the front wheels 14 beneath the upper deck 26 and the operators cabin 28.

The internal combustion engine 40 drives an alternator 60 mechanically to generate the required electrical energy for the electrical traction drive. Two AC motors 80, which are integrated to the left and right with the rear wheels 16, serve as the traction drive. The use of separate motors per vehicle side for the rear wheels 16 optimizes the cornering and maneuvering since different speeds can be selected for the driven wheels. Power electronics 100 with the required power components such as frequency converters, etc. are available for the control or regulation of the electric motors and of the alternator 60.

In the dump truck of the present invention, a number of secondary consumers of the dump truck are not electrically driven by the generated energy of the alternator 60, but are instead supplied hydraulically. For this purpose, it is made possible via a pump transfer case 50, which is mounted directly at the engine 40, that a small portion of the engine output power is branched off and is used for the drive of the secondary consumers. This small portion of the engine output power is picked up via the secondary drives (PTO) 51 and 52 and is supplied in a manner not shown in any more detail here to the hydraulic consumers. Alternatively, the pump transfer case 50 could also be attached to the alternator 60 or could be a component of the alternator 60.

The alternator 60 used in the present invention is a separately excited synchronous alternator. For this purpose, an excitation winding 62 is integrated in the alternator 60 in a known manner and is supplied via an excitation circuit 64. The excitation circuit 64 is connected to a supply line 66 for the control signals for controlling the excitation voltage. It is connected via a switch cabinet to a voltage supply 68 of the excitation circuit.

Figure 3:
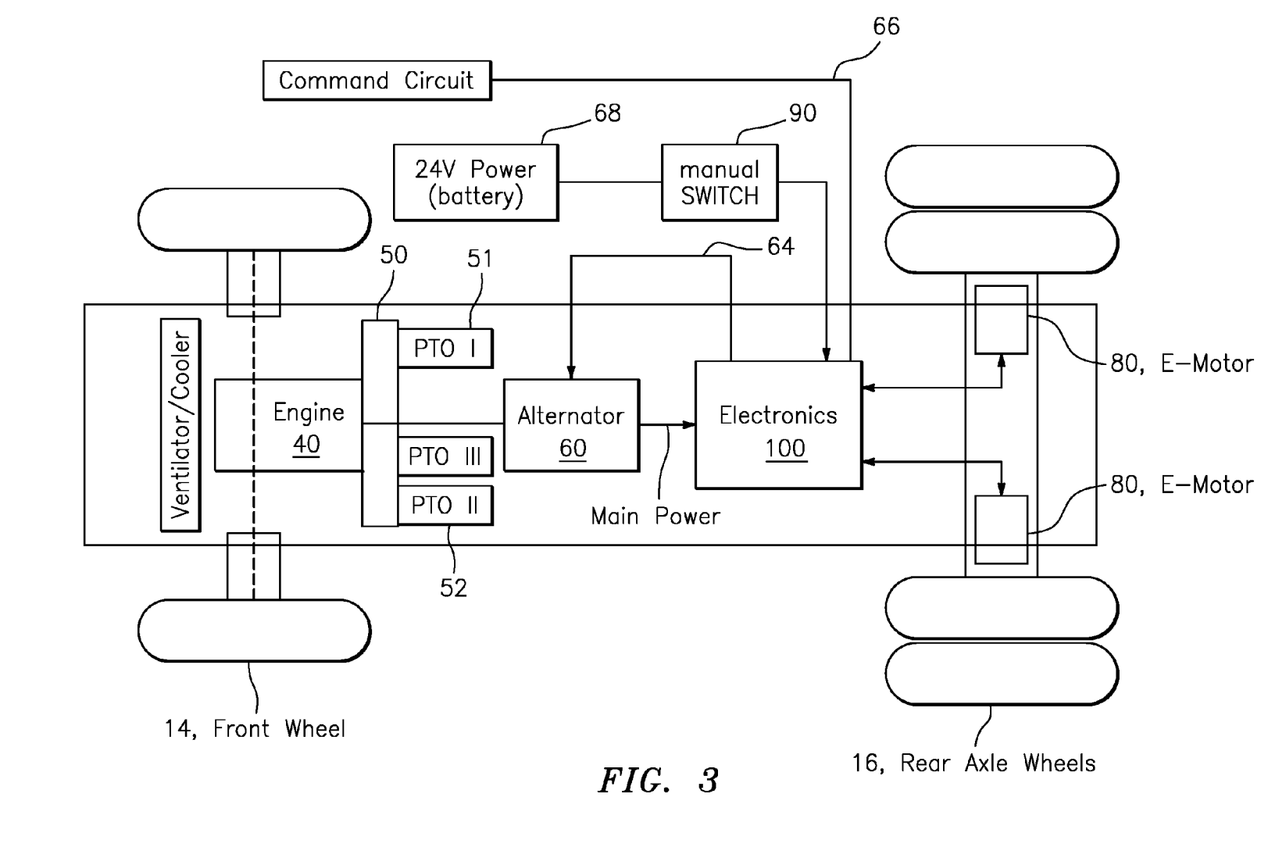
FIGS. 3 to 5: different schematic representations of the drivetrain with different solution possibilities for arranging a breaker switch in accordance with the solution of the present invention.
Figure 4:
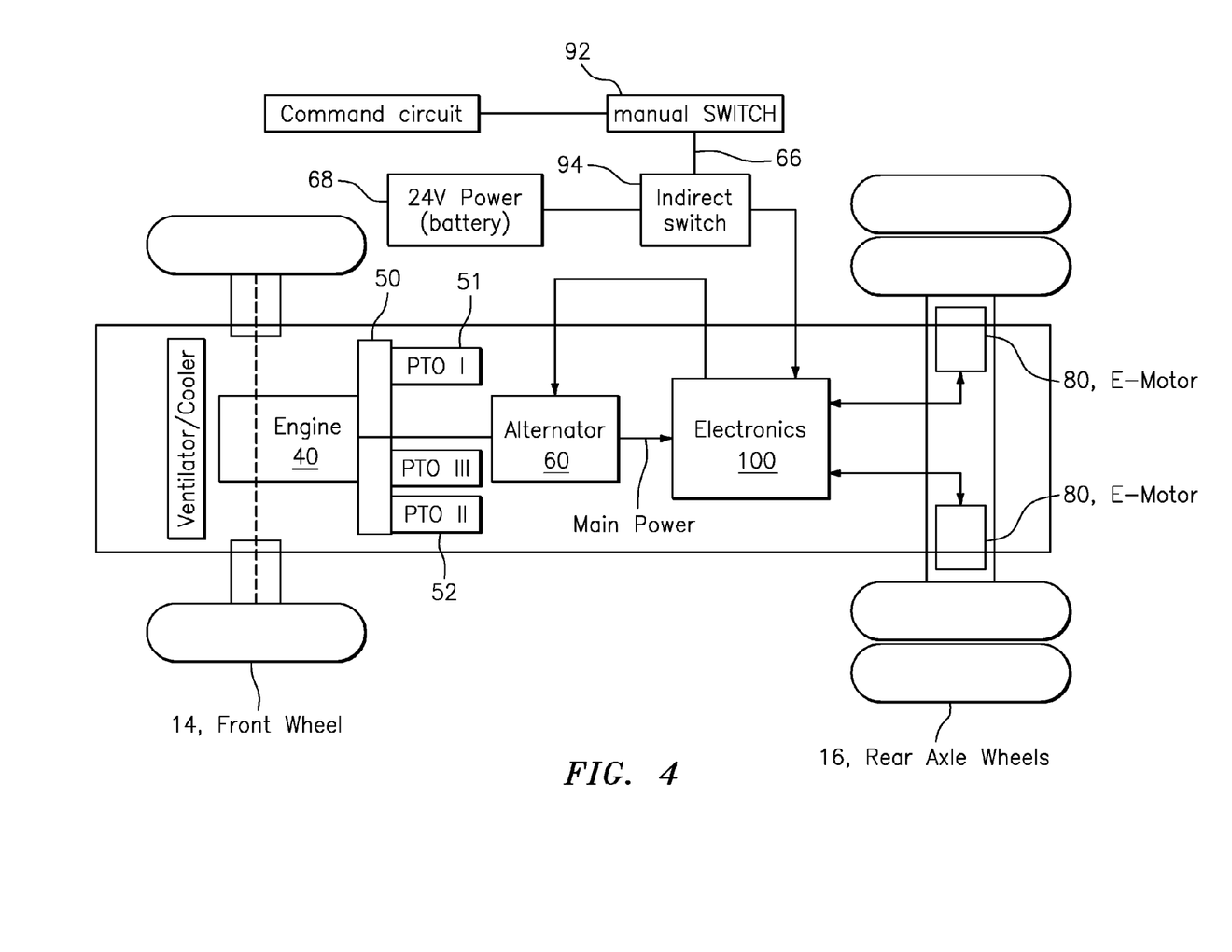
Figure 5:
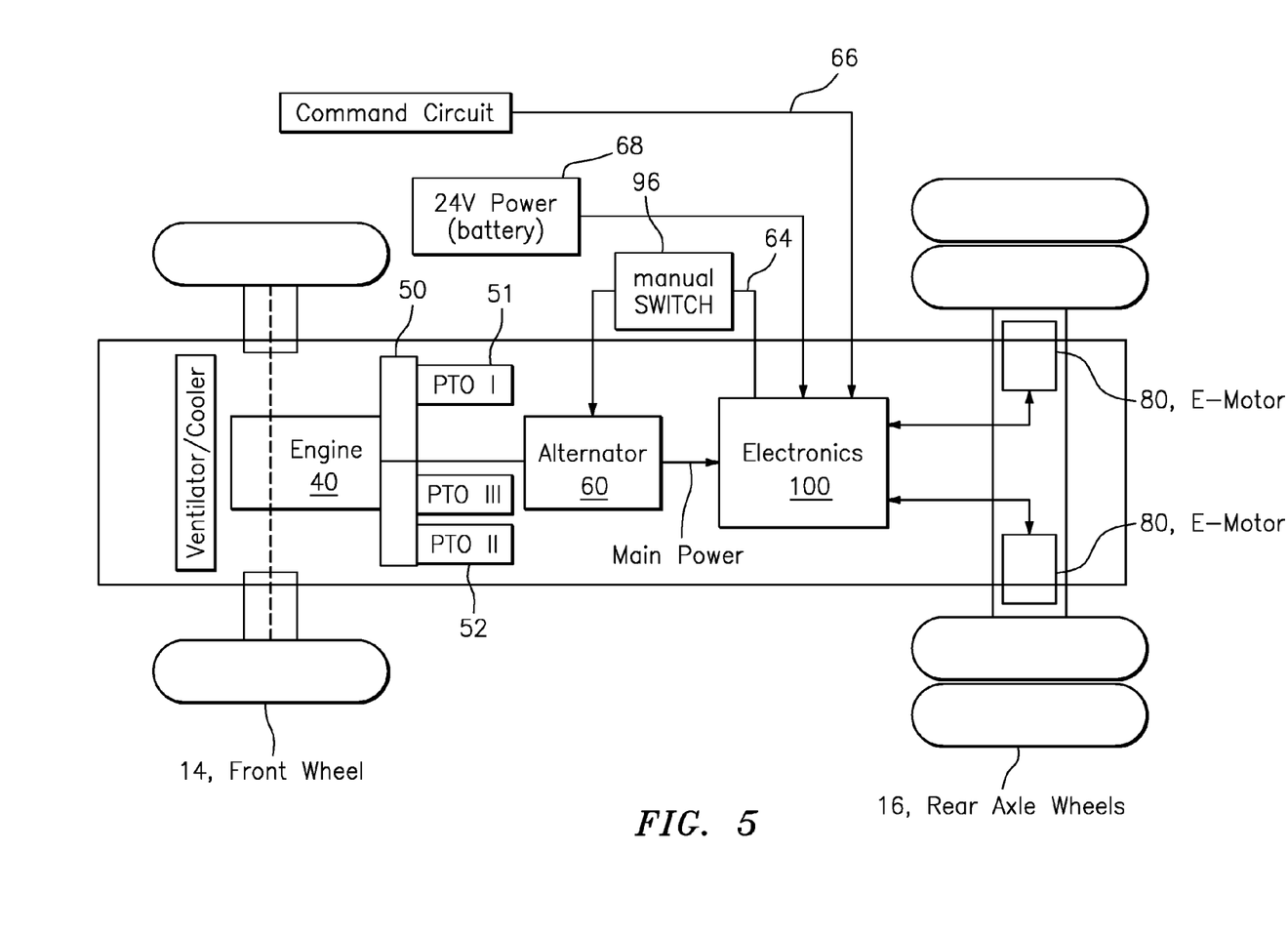
Figure 6:
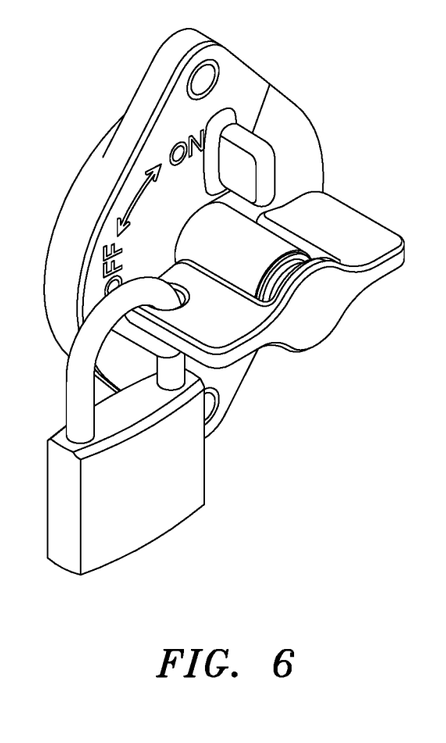
FIG. 6: illustrate a view of the breaker switch being secured by a lock.

Different embodiments of the invention are shown in FIGS. 3 to 5.

In the embodiment in accordance with FIG. 3, a breaker switch 90 is arranged in the voltage supply of the excitation circuit. The power supply for the excitation circuit can therefore be interrupted by actuating the breaker switch. The power generation by the alternator 60 is hereby effectively and safely interrupted.

In the embodiment in accordance with FIG. 4, a different, alternative arrangement of a breaker switch 92 is shown. It is arranged in a supply line 66 for the control signals for controlling the excitation voltage. An indirect switch 94 arranged in the voltage supply line of the excitation circuit is additionally actuated by the breaker switch 92. Alternatively, the indirect switch 94 can also be configured as a manual switch so that both the supply line 66 of the control signals of the excitation circuit 64 and the voltage supply 68 of the excitation circuit 64 can be manually interrupted.

Finally, a third embodiment of the invention is shown in FIG. 5 in which a breaker switch 96 is arranged in the supply line 64 which extends between the power electronics 100 and the alternator 60.

In FIG. 1, three different positions are indicated in the region of the dump truck 10 at which the breaker switch can respectively be particularly advantageously arranged since it can be actuated there in an easily reachable manner by the operating personnel. A first preferred position in the region of the dump truck 10 is marked by 110. The breaker switch is here arranged close to the electric motors 80 and to the power electronics 100 not shown in any more detail here in FIG. 1. At this position, the operating personnel can actuate the breaker switch directly before the start of the maintenance or repair work.

A further preferred position results at 112 in the region of a switch cabinet for low-voltage switches, not shown in any more detail here, which is arranged at the maintenance and service access in the frontal region of the work machine.

Finally, a preferred arrangement of the breaker switch on the upper deck 26 of the dump truck 10 results at 114 close to the operator's cabin 28.

A particular property of the invention is that a dump operation can also be ensured due to the running internal combustion engine even with a safe interruption of the power supply. The skip can thereby be easily used for purposes other than intended as an auxiliary crane. Some machine components can be raised by the tilt movement. For example, some electronic components which were previously switched without current can be raised from the frame by means of the skip and can be easily replaced during the service or maintenance.

The invention claimed is:

1. A work machine, in particular in the form of a dump truck or truck, having a diesel electric traction drive, comprising
    pairs of front and rear wheels (14, 16),
    electric motors (80) arranged to drive the rear wheels (16),
    a skip (18) pivotally connected to a frame of the truck,
    an internal combustion engine (40),
    an alternator (60) connected to the electric motors (80) and driven by the internal combustion engine (40),
    an excitation winding (62) integrated in the alternator (60),
    an excitation circuit (64) supplying the excitation winding (62) with current,
    a supply line (66) connected to the excitation circuit (64) for controlling excitation voltage,
    a voltage supply (68) connected to the supply line (66),
    a manually-actuatable breaker switch (90, 92, 94, 96) arranged to interrupt the excitation circuit (64),
    power electronics (100) interconnecting the alternator (60) and electric motors (80), with the supply line (66) and excitation circuit (64) also connected to one another through the power electronics (100),
    a switch cabinet for low voltage switches interconnecting the voltage supply (68) and excitation circuit (64),
    a pump transfer case (50) mounted directly at the internal combustion engine (40), and
    secondary drives (51, 52) mounted to the pump transfer case (50) for hydraulically driving secondary consumers of power.

2. A work machine in accordance with claim 1, wherein the breaker switch is arranged in the voltage supply of the excitation circuit.

3. A work machine in accordance with claim 1, wherein the breaker switch is arranged in the supply line for the control signals for controlling the excitation current.

4. A work machine in accordance with claim 3, wherein a breaker switch in the voltage supply and the breaker switch in the supply line for the control signals are coupled with one another so that, on a manual actuation of one breaker switch, the second breaker switch automatically switches.

5. A work machine in accordance with claim 1, wherein the breaker switch is arranged in the supply line of the excitation circuit to the alternator.

6. A work machine in accordance with claim 1, wherein the respective breaker switch is securable via a lock.

7. A work machine in accordance with claim 1, wherein one or more said breaker switches are arranged at a position of the work machine accessible from the outside.

8. A work machine in accordance with claim 7, wherein the breaker switch is arranged close to the electrical drive motors.

9. A work machine in accordance with claim 7, wherein the breaker switch is arranged in the region of the maintenance and service access in a frontal region of the work machine.

10. A work machine in accordance claim 7, wherein the breaker switch is arranged in a switch cabinet for low-voltage switches.

11. A work machine in accordance with claim 7, wherein the breaker switch is arranged on an upper deck of the work machine, preferably in a region of an operator's cabin.

12. A work machine in accordance with claim 1, wherein the skip (18) is configured to operate as an auxiliary crane on a safe interruption of power generation for maintenance and/or service work, so that electronic components of the current generation can be raised with the aid of the skip (18) and replaced.

13. A work machine in accordance with claim 1, wherein the breaker switch (90, 92, 94, 96) is located
    adjacent (110) the electric motors (80) and power electronics (100), or
    adjacent (112) the switch cabinet for low voltage switches, or
    on (114) a upper deck (26) of the truck (10) adjacent an operator's cabin (28).

* * * * *